United States Patent
Ling et al.

(10) Patent No.: US 10,528,788 B2
(45) Date of Patent: Jan. 7, 2020

(54) OPTICAL FINGERPRINT MODULE

(71) Applicant: Shanghai Oxi Technology Co., Ltd, Shanghai (CN)

(72) Inventors: Yan Ling, Shanghai (CN); Hong Zhu, Shanghai (CN); Zhicheng Na, Shanghai (CN)

(73) Assignee: SHANGHAI OXI TECHNOLOGY CO., LTD, Shanghai (CN)

(*) Notice: Subject to any disclaimer, the term of this patent is extended or adjusted under 35 U.S.C. 154(b) by 57 days.

(21) Appl. No.: 15/572,076

(22) PCT Filed: Aug. 18, 2016

(86) PCT No.: PCT/CN2016/095849
§ 371 (c)(1),
(2) Date: Nov. 6, 2017

(87) PCT Pub. No.: WO2017/118031
PCT Pub. Date: Jul. 13, 2017

(65) Prior Publication Data
US 2018/0121707 A1    May 3, 2018

(30) Foreign Application Priority Data
Jan. 7, 2016   (CN) .......................... 2016 1 0008090

(51) Int. Cl.
*G06K 9/28*    (2006.01)
*G06K 9/00*    (2006.01)
*G06K 9/20*    (2006.01)

(52) U.S. Cl.
CPC ....... *G06K 9/00087* (2013.01); *G06K 9/0004* (2013.01); *G06K 9/0008* (2013.01);
(Continued)

(58) Field of Classification Search
CPC ............ G06K 9/0004; G06K 9/00046; G06K 9/00006–9/0012
See application file for complete search history.

(56) References Cited

U.S. PATENT DOCUMENTS

| | | | | |
|---|---|---|---|---|
| 5,736,734 A | * | 4/1998 | Marcus | ............ G06K 9/00046 250/225 |
| 6,195,448 B1 | * | 2/2001 | Schiller | ............ G06K 9/00046 356/71 |

(Continued)

FOREIGN PATENT DOCUMENTS

| | | |
|---|---|---|
| CN | 2590070 | 12/2003 |
| CN | 1983300 | 6/2007 |

(Continued)

OTHER PUBLICATIONS

Norland Optical Adhesive 81, Norland Products Incorporated, 2 page datasheet, date unknown. (Year: 2019).*

(Continued)

*Primary Examiner* — Brian Werner
(74) *Attorney, Agent, or Firm* — Adsero IP

(57) ABSTRACT

An optical fingerprint module comprises: an optical fingerprint sensor, the optical fingerprint sensor having a non-opaque substrate and a device layer located on a surface of the non-opaque substrate, the device layer having a pixel area, the pixel area having a plurality of pixels, each pixel having a non-opaque area and a light blocking area, the light blocking area having a photosensitive element, the non-opaque area enabling lights to transmit through the pixel area of the device layer; a protection layer located above the optical fingerprint sensor; and a backlight source located under the pixel area, an included angle formed between a light emitted from the backlight source and an upper surface of the protection layer being an acute angle. The optical (Continued)

fingerprint module has an improved structure and enhanced performance.

18 Claims, 6 Drawing Sheets

(52) U.S. Cl.
CPC ....... *G06K 9/0012* (2013.01); *G06K 9/00046* (2013.01); *G06K 9/20* (2013.01)

(56) References Cited

U.S. PATENT DOCUMENTS

| | | | |
|---|---|---|---|
| 2004/0114783 A1* | 6/2004 | Spycher | G06K 9/00046 382/124 |
| 2004/0252867 A1 | 12/2004 | Lan | |
| 2008/0219522 A1 | 9/2008 | Hook | |
| 2010/0321152 A1 | 12/2010 | Argudyaev | |
| 2012/0070043 A1 | 3/2012 | Higuchi | |
| 2012/0321149 A1 | 12/2012 | Carver | |
| 2013/0119237 A1 | 5/2013 | Raguin | |
| 2013/0120760 A1* | 5/2013 | Raguin | G01B 11/24 356/612 |
| 2015/0165479 A1 | 6/2015 | Lasiter | |
| 2015/0371074 A1 | 12/2015 | Lin | |
| 2016/0092717 A1 | 3/2016 | Ling | |
| 2016/0092718 A1* | 3/2016 | Jensen | G06K 9/00013 382/124 |
| 2016/0247010 A1* | 8/2016 | Huang | G02B 5/20 |
| 2017/0110504 A1 | 4/2017 | Panchawagh | |
| 2017/0147855 A1 | 5/2017 | Wu | |
| 2018/0225498 A1 | 8/2018 | Setlak | |

FOREIGN PATENT DOCUMENTS

| | | |
|---|---|---|
| CN | 101416202 A | 4/2009 |
| CN | 102081483 A | 6/2011 |
| CN | 102804229 | 11/2012 |
| CN | 103019474 A | 4/2013 |
| CN | 203405831 | 1/2014 |
| CN | 104318199 A | 1/2015 |
| CN | 104318205 | 1/2015 |
| CN | 104537349 | 4/2015 |
| CN | 204463157 | 7/2015 |
| CN | 104933421 | 9/2015 |
| CN | 204759454 | 11/2015 |
| CN | 105184230 A | 12/2015 |
| CN | 105184248 | 12/2015 |
| CN | 204856529 | 12/2015 |
| JP | H 08101914 | 4/1996 |

OTHER PUBLICATIONS

International Search Report from PCT/CN2016/095848 dated Nov. 18, 2016.
International Search Report from PCT/CN2016/095849 dated Oct. 26, 2016.
Office Action from Chinese Application No. 201610008090.8, dated Apr. 1, 2019.
Office Action from U.S. Appl. No. 15/570,776 dated Feb. 26, 2019.

* cited by examiner

OPTICAL FINGERPRINT MODULE

CROSS-REFERENCE TO RELATED APPLICATIONS

This application is the national phase of International Application No. PCT/CN2016/095849, filed on Aug. 18, 2016, which claims the benefit of priority to Chinese Patent Application No. 201610008090.8, filed on Jan. 7, 2016, and entitled "OPTICAL FINGERPRINT MODULE", the entire disclosure of which are incorporated herein by reference.

TECHNICAL FIELD

The present disclosure generally relates to optical fingerprint identification field, and more particularly, to an optical fingerprint module.

BACKGROUND

Fingerprint imaging recognition technology is used to realize identification by capturing fingerprint images of a person using optical fingerprint sensors and then determining whether the fingerprint images match those stored in a system before. Due to its convenience in use and uniqueness of human fingerprints, the fingerprint recognition technology has been widely applied to various fields, such as safety inspection field (for example, public security bureau or customs), entrance guard systems in buildings, consumption goods field (for example, personal computers or mobile phones), and the like. The fingerprint recognition technology includes optical imaging, capacitive imaging, ultrasonic imaging and the like, among which, the optical fingerprint recognition technology is advantageous in imaging quality and device cost.

As shown in FIG. 1, an existing optical fingerprint module includes a backlight source 110, an optical fingerprint sensor 120, a protective layer 130 and a shell (not shown is FIG. 1). To acquire a fingerprint image, a finger 140 of a person is placed on the protective layer 130. Output light 111 of the backlight source 110 (upward arrows in FIG. 1 represent the output light 111, and the upward arrows are surrounded by dotted lines to be marked in a unified manner) penetrates through the optical fingerprint sensor 120 and the protective layer 130, and is reflected and transmitted at a contact interface between the finger 140 and the protective layer 130. Reflected light 112 (downward arrows in FIG. 1 represent the reflected light 112, and the downward arrows are surrounded by dotted lines to be marked in a unified manner) penetrates through the protective layer 130 and irradiates onto the optical fingerprint sensor 120. Circuits (not shown in FIG. 1) inside the optical fingerprint sensor 120 perform photoelectric conversion and signal processing to realize acquisition of the fingerprint image. As a contact part between the finger 140 and the protective layer 130 reflects fingerprint characteristics of the person, and characteristic of the contact part can directly indicate characteristic of the reflected light 112, the image acquired by the optical fingerprint sensor 120 directly reflects the fingerprint characteristics of the person.

More content related to optical fingerprint sensors can be found in Chinese Utility Model Patent with a publication No. CN203405831U.

Structures and performance of existing optical fingerprint modules need to be improved.

SUMMARY

In embodiments of the present disclosure, an optical fingerprint module is provided with an optimized structure to improve performance.

In an embodiment of the present disclosure, an optical fingerprint module is provided, including: an optical fingerprint sensor including a non-opaque substrate and a device layer located on a surface of the non-opaque substrate, wherein the device layer includes a pixel area consisting of a plurality of pixels, each of the plurality of pixels includes a non-opaque region and a light blocking region, the light blocking region includes a photosensitive element, and the non-opaque region enables light to penetrate through the pixel area of the device layer; a protective layer disposed above the optical fingerprint sensor; and a backlight source disposed below the pixel area, wherein an acute angle is formed between light emitted from the backlight source and an upper surface of the protective layer.

Optionally, a first optical adhesive layer may be disposed between the optical fingerprint sensor and the protective layer, wherein the light emitted from the backlight source penetrates through the non-opaque substrate, then penetrates through the device layer via the non-opaque region, enters the first optical adhesive layer, and finally enters the protective layer from the first optical adhesive layer.

Optionally, a first optical adhesive layer may be disposed between the optical fingerprint sensor and the protective layer, wherein the light emitted from the backlight source penetrates through the device layer via the non-opaque region, then penetrates through the non-opaque substrate, enters the first optical adhesive layer, and finally enters the protective layer from the first optical adhesive layer.

Optionally, the backlight source may include at least one Light Emitting Diode (LED), and light of the LED is near-ultraviolet light, purple light, blue light, green light, yellow light, red light, near-infrared light or white light.

Optionally, the backlight source may include at least two LEDs which are symmetrically arranged below the optical fingerprint sensor, and light of the LEDs may be near-ultraviolet light, purple light, blue light, green light, yellow light, red light, near-infrared light or white light.

Optionally, a light focusing lens may be disposed in front of a light emitting surface of the LED, the light focusing lens may be capable of focusing light of the LED into parallel light or near-parallel light, and the light emitted from the backlight source enters the light focusing lens and then enters the optical fingerprint sensor.

Optionally, a light anti-reflection layer, which is capable of increasing a proportion of the light emitted from the backlight source which enters into the optical fingerprint sensor, may be disposed on a surface of the optical fingerprint sensor which is close to the backlight source.

Optionally, a non-opaque dielectric layer may be disposed between the optical fingerprint sensor and the backlight source, and the light emitted from the backlight source enters the non-opaque dielectric layer and then enters the optical fingerprint sensor.

Optionally, a side surface or a lower surface of the non-opaque dielectric layer may be a light focusing surface, and the light emitted from the backlight source enters the non-opaque dielectric layer from the light focusing surface which focuses the light emitted from the backlight source into parallel light or near-parallel light.

Optionally, a second optical adhesive layer may be disposed between the optical fingerprint sensor and the non-opaque dielectric layer, wherein the light emitted from the backlight source enters the second optical adhesive layer from the non-opaque dielectric layer, and then enters the optical fingerprint sensor from the second optical adhesive layer.

Optionally, a light anti-reflection layer, which is capable of increasing a proportion of the light emitted from the backlight source which enters into the non-opaque dielectric layer, may be disposed on the side surface or the lower surface of the non-opaque dielectric layer.

Optionally, the non-opaque dielectric layer may include glass, plastic or optical adhesive.

Optionally, the non-opaque dielectric layer may have a refraction index above 1.2.

Optionally, the light focusing surface of the non-opaque dielectric layer may be an oblique surface, a spherical crown surface, an ellipsoidal crown surface, a conical side surface or a pyramid side surface.

Optionally, the protective layer may include a single layer or multiple layers, wherein a light filtering layer is disposed on at least one of the upper surface of the protective layer, a lower surface of the protective layer and an upper surface of the optical fingerprint sensor.

Optionally, the device layer may further include a plurality of scanning lines arranged in a first axial direction and a plurality of data lines arranged in a second axial direction, wherein the plurality of scanning lines and the plurality of data lines define a plurality of grids, and the pixels are located in the grids.

Optionally, the first optical adhesive layer may be a heat curing optical adhesive layer, a photo curing optical adhesive layer or an optical double-sided adhesive tape.

Optionally, the second optical adhesive layer may be a heat curing optical adhesive layer, a photo curing optical adhesive layer or an optical double-sided adhesive tape.

Embodiments of the present disclosure may provide following advantages. In embodiments of the present disclosure, an optical fingerprint module is provided, including: an optical fingerprint sensor including a non-opaque substrate and a device layer located on a surface of the non-opaque substrate, wherein the device layer includes a pixel area consisting of a plurality of pixels, each of the plurality of pixels includes a non-opaque region and a light blocking region, the light blocking region includes a photosensitive element, and the non-opaque region enables light to penetrate through the pixel area of the device layer; a protective layer disposed above the optical fingerprint sensor; and a backlight source disposed below the pixel area, wherein an acute angle is formed between light emitted from the backlight source and an upper surface of the protective layer. By disposing the backlight source below the pixel area, the light emitted from the backlight source first penetrates through the optical fingerprint sensor (penetrating through the optical fingerprint sensor includes penetrating through the non-opaque substrate, or penetrating through both the non-opaque substrate and the pixel area) and then reaches the protective layer, where the acute angle is formed between the light emitted from the backlight source and the upper surface of the protective layer. As having the acute angle with the upper surface of the protective layer, all the light reaching the upper surface of the protective layer may be reflected at a contact interface between the upper surface of the protective layer and a fingerprint at corresponding shift distances, and most effective reflected light irradiates into pixels in the pixel area which have nearly same shift distances from corresponding reflection points. Therefore, by the above optical fingerprint module without a light guiding plate, fingerprint image recognition may be well achieved by acquiring a clear fingerprint image, a structure of the optical fingerprint module may be simplified, and cost may be reduced.

Further, the backlight source may include two LEDs. During the fingerprint image acquisition, any one of the two LEDs may be selected as an imaging light source of the fingerprint image, or light emitted from the two LEDs may be used in turn for imaging, and afterward, corresponding image calculation is performed, so that a fingerprint image may be acquired with less distortion and higher accuracy, and thus performance of the optical fingerprint module may be further improved.

Further, the surface of the optical fingerprint sensor which is close to the backlight source may further have a light anti-reflection layer thereon, and the light anti-reflection layer is capable of increasing the proportion of light emitted from the backlight source which enters into the optical fingerprint sensor. In this way, the fingerprint image may be acquired using more light to have higher quality and accuracy, and thus performance of the optical fingerprint module may be further improved.

Further, a light focusing lens which is capable of focusing the light emitted from the backlight source into parallel light or near-parallel light may be disposed in front of the light emitting surface of the backlight source. The light emitted from the backlight source enters the light focusing lens, and then enters the optical fingerprint sensor. As a result, the fingerprint image may be acquired using the parallel light or the near-parallel light to have less distortion and higher accuracy, and thus performance of the optical fingerprint module may be further improved.

Further, a non-opaque dielectric layer may be further disposed between the optical fingerprint sensor and the backlight source. The non-opaque dielectric layer has a refractive index greater than that of air, and light is enabled to enter the non-opaque dielectric layer from a side surface of the non-opaque dielectric layer, so that the light emitted from the backlight source reaches the upper surface of the protective layer with a greater incident angle (that is, the light can reach the upper surface of the protective layer in a direction closer to be parallel to the upper surface of the protective layer). When the incident angle of the light is larger than a certain angle, total reflection occurs (i.e., when the incident angle is greater than a critical angle, the light is totally reflected at a contact interface between the protective layer and air) to greatly improve quality of the image, so that the fingerprint image may be acquired with higher quality and accuracy, and thus performance of the optical fingerprint module may be further improved.

Furthermore, the side surface or the lower surface of the non-opaque dielectric layer may serve as a light focusing surface which is capable of focusing light of the backlight source into parallel light or near-parallel light. The light emitted from the backlight source enters the non-opaque dielectric layer from the light focusing surface, and then enters the optical fingerprint sensor. As a result, the fingerprint image may be acquired using the parallel light or the near-parallel light to have less distortion and higher accuracy, and thus performance of the optical fingerprint module may be further improved.

Further, the side surface or the lower surface of the non-opaque dielectric layer may further have a light anti-reflection layer formed thereon, and the light anti-reflection layer is capable of increasing the proportion of the light emitted from the backlight source which enters the non-opaque dielectric layer. Therefore, the fingerprint image may be acquired using more light to have higher quality and accuracy, and thus performance of the optical fingerprint module may be further improved.

DETAILED DESCRIPTION

Figure 1:
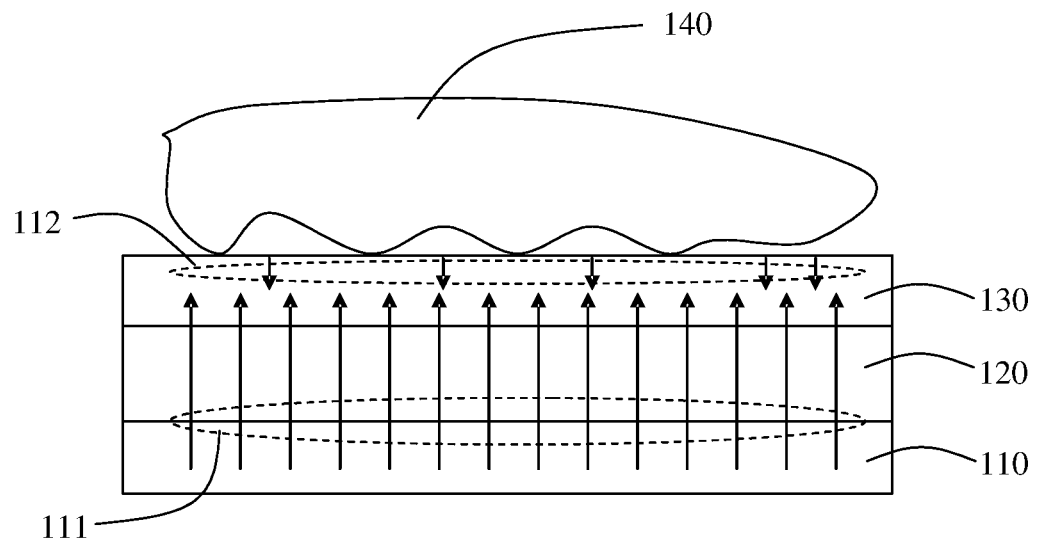
FIG. 1 schematically illustrates a structural diagram of an optical fingerprint module in existing techniques.
Figure 2:
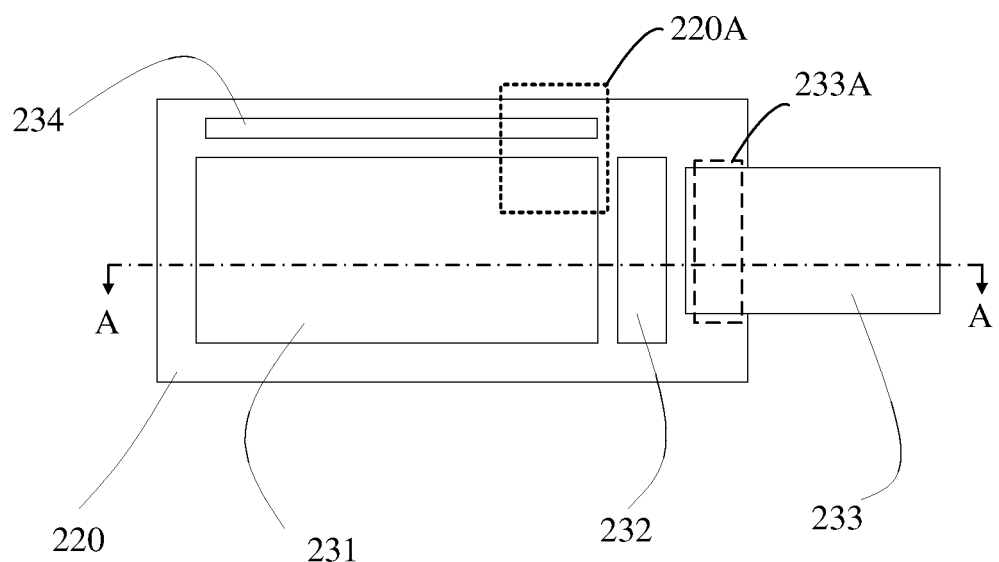
FIG. 2 schematically illustrates a top view of an optical fingerprint sensor in existing techniques.
Figure 3:
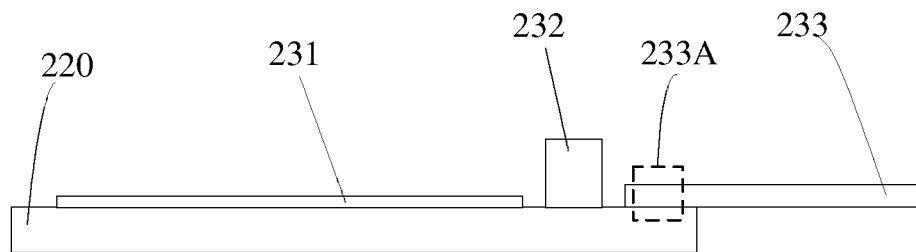
FIG. 3 schematically illustrates a sectional view of the optical fingerprint sensor along an A-A line as shown in FIG. 2.

An existing optical fingerprint sensor has structures as shown in FIGS. 2 and 3. FIG. 2 schematically illustrates a top view of the optical fingerprint sensor, and FIG. 3 schematically illustrates a sectional view of the optical fingerprint sensor along an A-A line as shown in FIG. 2. The optical fingerprint sensor includes a glass substrate 220, and a pixel array region 231 and a peripheral circuit which are disposed on the glass substrate 220. The peripheral circuit includes a driving circuit 234, a signal readout chip 232 and a flexible printed circuit board 233. The pixel array region 231 includes a pixel array for receiving, focusing and temporarily storing optical signals. The peripheral circuit further includes a flexible printed circuit board bonding area 233A, and connecting wires (not shown in FIG. 3) among the pixel array region 231, a bonding region of the signal readout chip 232 and the flexible printed circuit board bonding area 233A.

Figure 4:
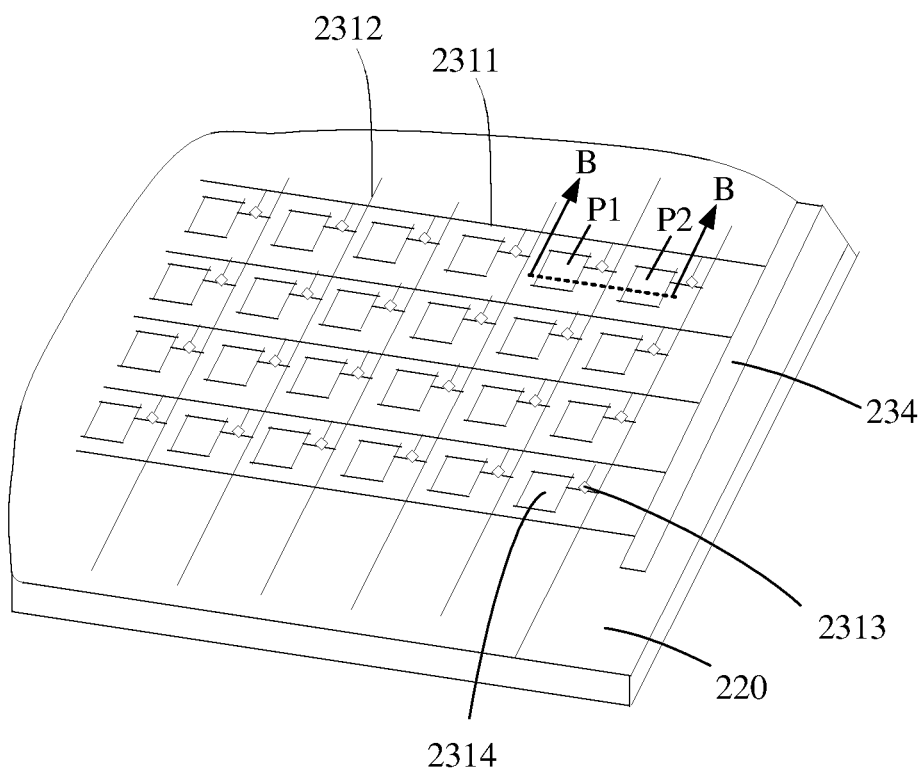
FIG. 4 schematically illustrates an enlarged diagram of a structure surrounded by a dotted box 220A in the optical fingerprint sensor as shown in FIG. 2.

FIG. 4 schematically illustrates an enlarged diagram of a structure surrounded by a dotted box 220A in the optical fingerprint sensor as shown in FIG. 2. Referring to FIG. 4, the pixel array region 231 includes a plurality of pixels (not labeled in FIG. 4) arranged in a row-column array, and the row and column of the pixel are defined by a plurality of scanning lines 2311 in a first axial direction and a plurality of data lines 2312 in a second axial direction. Each pixel includes a signal control switch 2313, a photoelectric conversion device 2314 and a non-opaque region (not labeled in FIG. 4). Corresponding backlight can penetrate through the optical fingerprint sensor via the non-opaque region. The scanning lines 2311 are connected to the driving circuit 234, and the data lines 2312 are connected to the bonding region of the signal readout chip 232.

Figure 5:
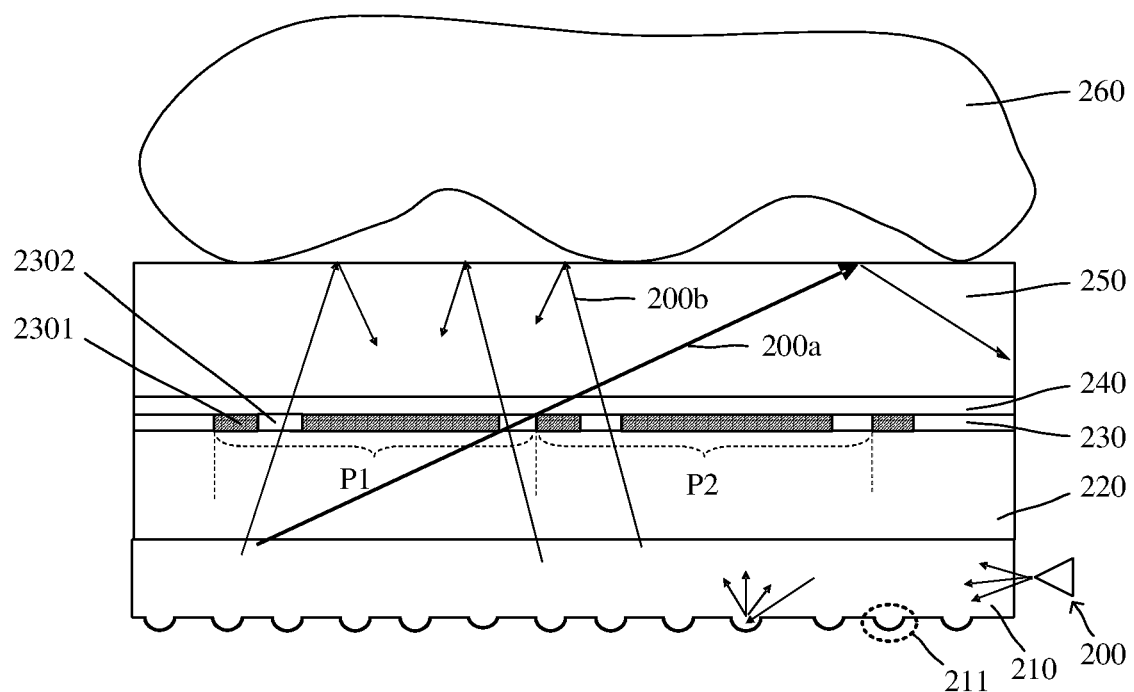
FIG. 5 schematically illustrates a sectional view of an optical fingerprint module where the optical fingerprint sensor in FIG. 4 is located along a B-B dotted line in FIG. 2.

FIG. 5 schematically illustrates a sectional view of an optical fingerprint module where the optical fingerprint sensor in FIG. 4 is located along a B-B dotted line in FIG. 2. The B-B dotted line passes through pixels P1 and P2 in FIG. 4. Referring to FIG. 5, the optical fingerprint module includes a backlight source 200, a light guiding plate 210, an optical fingerprint sensor (not labeled), an adhesive layer 240 and a protective layer 250. The optical fingerprint sensor includes a non-opaque substrate 220 and a device layer 230 disposed on a surface of the non-opaque substrate 220. Each of the pixels P1 and P2 includes a light blocking region 2301 and a non-opaque region 2302.

In the existing optical fingerprint module, the backlight source 200 is generally an LED which is arranged at one side surface of the light guiding plate 210, and light emitted from the backlight source 200 irradiates into the light guiding plate 210 in a certain open angle. Small hemispherical or semi-ellipsoidal bumps 211 are arranged on a bottom surface of the light guiding plate 210. When irradiating onto the small bumps 211, light inside the light guiding plate 210 may be scattered, so that a direction of the light is changed to realize upward irradiation. Further, a reflecting coating (not shown in FIG. 5) may be disposed on bottom (below the small bumps 211) and side surfaces of the light guiding plate 210. When the light reaches the bottom or side surfaces of the light guiding plate 210, most of the light may be reflected back to the light guiding plate 210, and scattered upward by the small bumps 211.

However, as the light scattered upward by the small bumps 211 at the bottom surface of the light guiding plate 210 has a certain angle distribution range, some of the light may be vertically upward, while some is titled upward, even close to a horizontal direction (as the light 200a in FIG. 5). When the light 200b irradiates onto the protective layer 250 in a nearly vertical direction (that is, the light is perpendicular to an upper surface of the protective layer 250), and reflected and transmitted at a contact interface between a finger 260 and the protective layer 250, the reflected light may irradiate back to the optical fingerprint sensor in a nearly vertical direction, and further irradiate to pixels or nearby pixels under the fingerprint, to generate a relatively clear fingerprint image. While the light 200a is deviated from a vertical direction, even close to a horizontal direction, the reflected light may irradiate to pixels far away from pixels right under the fingerprint. Therefore, signals of the light 200a and the light 200b may be mixed together, so that a blurred fingerprint image may be formed.

Besides, the protective layer 250 may be relatively thick to achieve certain reliability. Therefore, for the existing optical fingerprint modules, it is almost unavoidable that relatively blurred fingerprint images are formed and even no fingerprint image can be formed.

Therefore, embodiments of the present disclosure provide an optical fingerprint module. By disposing the backlight source below the pixel area, the light emitted from the backlight source first penetrates through the optical fingerprint sensor (penetrating through the optical fingerprint sensor includes penetrating through the non-opaque substrate, or penetrating through both the non-opaque substrate and the pixel area) and then reaches the protective layer, where the acute angle is formed between the light emitted from the backlight source and the upper surface of the protective layer. As having the acute angle with the upper surface of the protective layer, all the light reaching the upper surface of the protective layer may be reflected at a contact interface between the upper surface of the protective layer and a fingerprint according to corresponding shift distances, and most effective reflected light irradiates into pixels in the pixel area which have nearly same shift distances from corresponding reflection points. Therefore, by the above optical fingerprint module without a light guiding plate, fingerprint image recognition may be well achieved by acquiring a clear fingerprint image, a structure of the optical fingerprint module may be simplified, and cost may be reduced.

In order to clarify the object, characteristic and advantages of embodiments of the present disclosure, embodiments of present disclosure will be described clearly in detail in conjunction with accompanying drawings.

Figure 6:
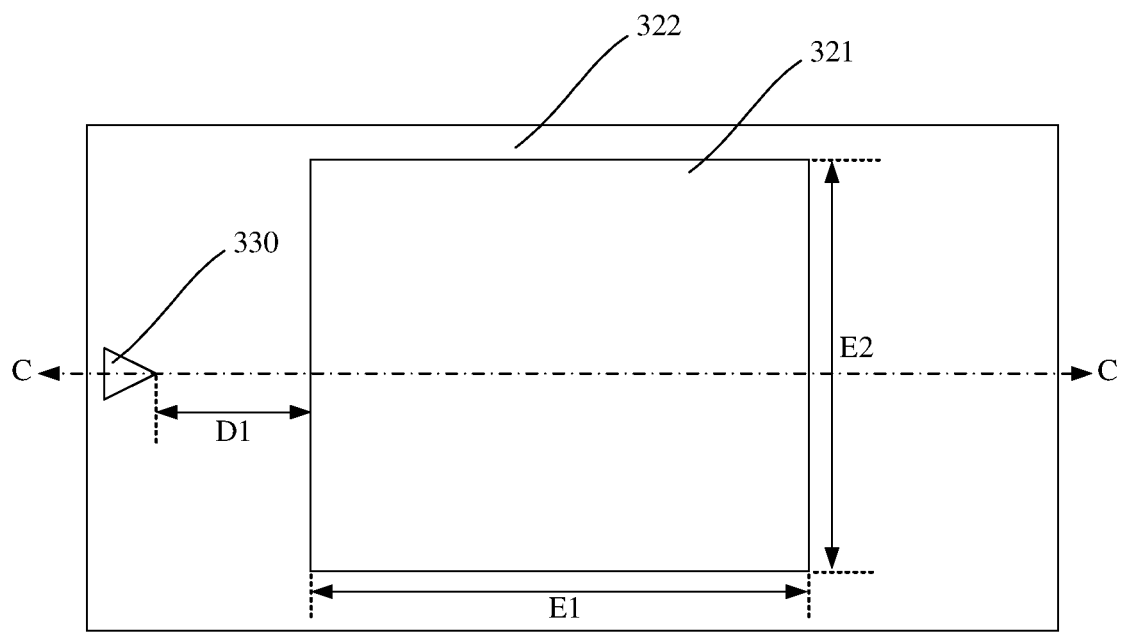
FIG. 6 schematically illustrates a top view of an optical fingerprint sensor and a backlight source in an optical fingerprint module according to an embodiment.
Figure 7:
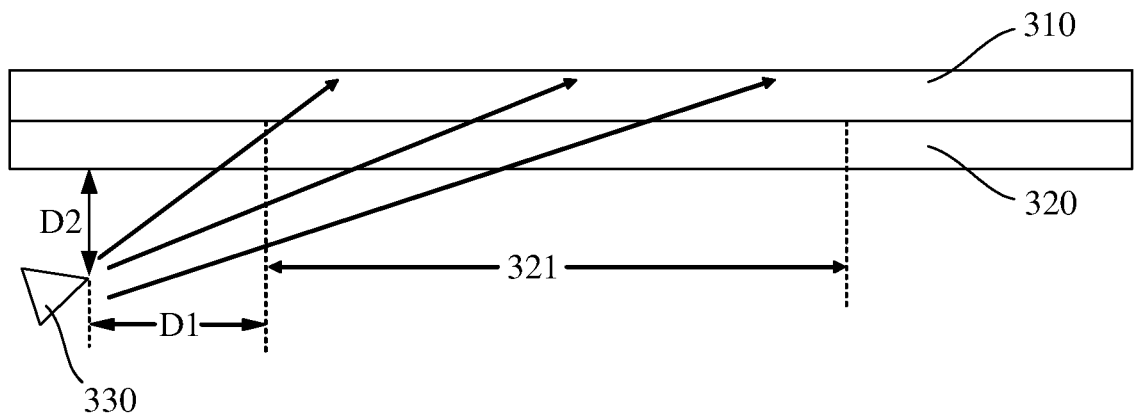
FIG. 7 schematically illustrates a sectional view of the optical fingerprint module according to the embodiment shown in FIG. 6.

In an embodiment, an optical fingerprint module is provided. FIG. 6 schematically illustrates a top view of an optical fingerprint sensor 320 and a backlight source 330 in the optical fingerprint module (i.e., a top view of the optical fingerprint module excluding a protective layer 310). FIG. 7 schematically illustrates a sectional view of the optical fingerprint module. It should be noted that, FIG. 7 schematically illustrates a sectional view of the optical fingerprint module along a C-C line in FIG. 6.

Referring to FIGS. 6 and 7, the optical fingerprint module includes the protective layer 310, the optical fingerprint sensor 320 and the backlight source 330.

It should be noted that FIG. 7 shows the optical fingerprint sensor 320 as an integral structure. In fact, the optical fingerprint sensor 320 includes a plurality of portions. As shown in the top view of the optical fingerprint sensor 320 in FIG. 6, the optical fingerprint sensor 320 includes a non-opaque substrate 322 and a pixel area 321. Still referring to FIG. 6, in some embodiments, the optical fingerprint sensor 320 includes a non-opaque substrate 322 and a device layer (not all shown, and not labeled) disposed on a surface of the non-opaque substrate 322, where the device layer includes the pixel area 321.

In some embodiments, the pixel area 321 is rectangular, where one side length of the pixel area 321 is E1, and the other adjacent side length is E2. The side length E1 and the side length E2 may be selected according to practical requirements of products. The pixel area 321 consists of a plurality of pixels (not shown in FIG. 6, and content related to the pixels can be referred to the above descriptions of FIGS. 4 and 5), and each pixel includes a non-opaque region and a light blocking region. The light blocking region includes a photosensitive element, and the non-opaque region enables light to penetrate through the pixel area 321 of the device layer.

It should be noted that, other areas located at the periphery of the pixel area 321 in the device layer may also be arranged to be non-opaque. That is, the pixel area 321 is non-opaque due to the non-opaque region of each pixel, while for an area except the pixel area 321, the whole area or a portion of the area may be made as a non-opaque structure, on the basis that a structure and a function of the area are guaranteed.

Referring to FIG. 7, the pixel area 321 is marked between two long dotted lines, representing that in a plane where the cross section in FIG. 7 is located, the pixel area 321 is located between the two long dotted lines of the optical fingerprint sensor 320, specifically, in a layer structure of the optical fingerprint sensor 320 between the two dotted lines (as shown in FIG. 6, the pixel area 321 is disposed on the non-opaque substrate 322). An area between the two dotted lines under the optical fingerprint sensor 320 is an area under the pixel area 321. In sectional views for other embodiments of the present specification, labeling of a pixel area is also carried out by adopting the above method, and is not described in detail below.

Referring to FIG. 7, the protective layer 310 is disposed on the optical fingerprint sensor 320, and the backlight source 330 is disposed below the pixel area 321, so that an acute angle is formed between light emitted from the backlight source 330 and the upper surface of the protective layer 310.

The light emitted from the backlight source 330 is shown as unidirectional arrows in FIG. 7. As the backlight source 330 is disposed below the pixel area 321, the backlight source 330 is located at one side of the pixel area 321 in the top view in FIG. 6. Referring to FIG. 7, an area under the pixel area 321 is an area between the two long dotted lines, while the backlight source 330 is disposed outside the area. Therefore, in the sectional view in FIG. 7, in a horizontal direction, there is a first distance D1 (which is also shown in FIG. 6) between the backlight source 330 and the area under the pixel area 321; and in a vertical direction, there is a second distance D2 between the backlight source 330 and the optical fingerprint sensor 320. As the pixel area 321 is a portion of the optical fingerprint sensor 320, a distance between the backlight source 330 and the pixel area 321 in the vertical direction is certainly no less than the second distance D2.

From above, due to the first distance D1 and the second distance D2, the backlight source 330 is certainly disposed below the pixel area 321. It could be understood that, the backlight source 330 being disposed below the pixel area 321 means that the backlight source 330 is disposed lower than but not right under the pixel area 321. In some embodiments, the first distance D1 and the second distance D2 may be adjusted to make the backlight source 330 in a suitable position, so as to improve quality of a fingerprint image formed by the optical fingerprint module.

It should be noted that, in other embodiments, if a non-opaque open angle of the backlight source 330 is large enough, or not all the pixel area is required to be normally imaged, the backlight source 330 may be arranged right under the pixel area 321. Namely, in the top view, the backlight source 330 is located at the edge of or in the pixel area 321, where the second distance D2 is zero or negative. In other embodiments, the backlight source may be arranged right under the pixel area.

In some embodiments, the backlight source 330 may include one LED, and light of the LED is near-ultraviolet light, purple light, blue light, green light, yellow light, red light, near-infrared light or white light.

In some embodiments, the backlight source 330 may include at least two LEDs which are symmetrically arranged below the optical fingerprint sensor 320, and light of the LEDs may be near-ultraviolet light, purple light, blue light, green light, yellow light, red light, near-infrared light or white light. When the backlight source 330 includes at least two LEDs, the light of the LEDs may be the same, or totally different, or partially different.

As not shown in the figures, in some embodiments, a first optical adhesive layer may be disposed between the optical fingerprint sensor 320 and the protective layer 310, and the device layer is disposed between the non-opaque substrate 322 and the protective layer 310 (the first optical adhesive layer is disposed between the device layer and the protective layer 310). The light emitted from the backlight source 330 penetrates through the non-opaque substrate 322 first, and then penetrates through the device layer via the non-opaque region, then enters the first optical adhesive layer, and then enters the protective layer 310 from the first optical adhesive layer.

In some embodiments, a first optical adhesive layer may be disposed between the optical fingerprint sensor 320 and the protective layer 310, and the non-opaque substrate 322 is disposed between the device layer and the protective layer 310 (the first optical adhesive layer is disposed between the non-opaque substrate 322 and the protective layer 310). The light emitted from the backlight source 330 penetrates through the device layer via the non-opaque region first, and then penetrates through the non-opaque substrate 322, then enters the first optical adhesive layer, and then enters the protective layer 310 from the first optical adhesive layer.

In some embodiments, the first optical adhesive layer may be a heat curing optical adhesive layer, a photo curing optical adhesive layer or an optical double-sided adhesive tape.

In some embodiments, the device layer may further include a plurality of scanning lines arranged in a first axial direction and a plurality of data lines arranged in a second axial direction, wherein the plurality of scanning lines and the plurality of data lines define a plurality of grids, and the pixels are located in the grids. Details may be referred to the above descriptions of FIGS. 4 and 5.

In some embodiments, the protective layer 310 may include a single layer. In some embodiments, the protective layer 310 may include multiple layers. Besides, a light filtering layer may be disposed on at least one of the upper surface of the protective layer 310, a lower surface of the protective layer 310 and an upper surface of the optical fingerprint sensor 320.

In the optical fingerprint module provided in embodiments of the present disclosure, by disposing the backlight source 330 below the pixel area 321, the light emitted from the backlight source 330 first penetrates through the optical fingerprint sensor 320 (penetrating through the optical fingerprint sensor 320 includes penetrating through the non-opaque substrate 322, or penetrating through both the non-opaque substrate 322 and the pixel area 321) and then reaches the protective layer 310, where the acute angle is formed between the light emitted from the backlight source 330 and the upper surface of the protective layer 310. As having the acute angle with the upper surface of the protective layer 310, all the light reaching the upper surface of the protective layer 310 may be reflected at a contact interface between the upper surface of the protective layer 310 and a fingerprint according to corresponding shift distances, and most reflected light irradiates into pixels in the pixel area 321 which have nearly same shift distances from corresponding reflection points. Therefore, by the above optical fingerprint module without a light guiding plate, fingerprint image recognition may be well achieved by acquiring a clear fingerprint image, a structure of the optical fingerprint module may be simplified, and cost may be reduced.

Figure 8:
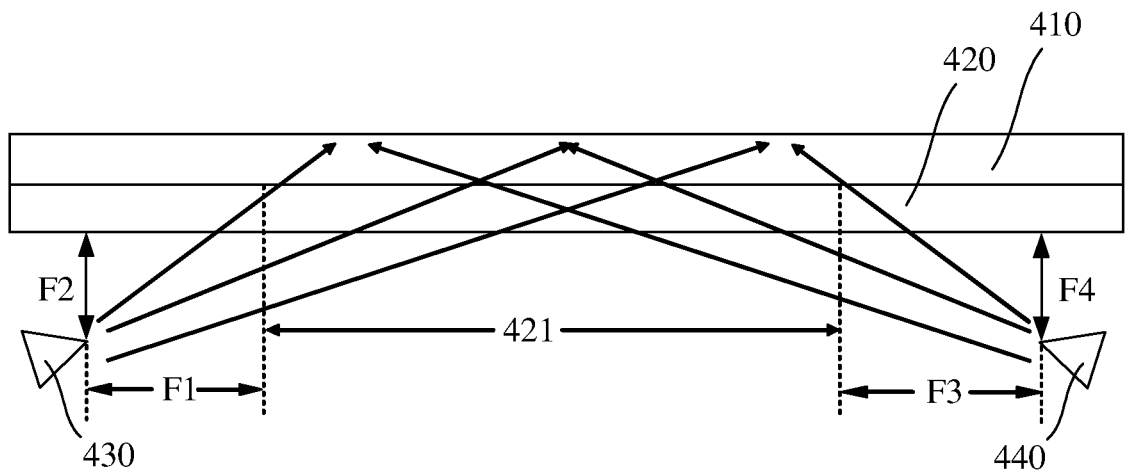
FIG. 8 schematically illustrates a sectional view of an optical fingerprint module according to an embodiment.

In an embodiment, another optical fingerprint module is provided. FIG. 8 schematically illustrates a sectional view of the optical fingerprint module. The optical fingerprint module includes a protective layer 410, an optical fingerprint sensor 420 and a backlight source. Details of the protective layer 410 and the optical fingerprint sensor 420 may be found in the descriptions of the protective layer 310 and the optical fingerprint sensor 320 in the above embodiment. Other unreferenced structures and content of the optical fingerprint module of the embodiment can also be referred to the above descriptions.

Same as the above embodiment as shown in FIGS. 6 and 7, in the embodiment as shown in FIG. 8, the backlight source is disposed below but not right under the pixel area 421, thus, an acute angle is formed between light emitted from the backlight source and an upper surface of the protective layer 410. Different from the above embodiment, in the embodiment as shown in FIG. 8, the backlight source includes two LEDs, an LED 430 and an LED 440. Light emitted from the LED 430 and the LED is shown with unidirectional arrows in FIG. 8. The LED 430 and the LED 440 are located below the pixel area 421. In a top view of FIG. 8, the LED 430 and the LED 440 are located out of the pixel area 421. In the sectional view shown in FIG. 8, an area where pixel area 421 is located is an area where the two long dotted lines are located, and the LED 430 and the LED 440 fall outside the area.

Therefore, in the sectional view shown in FIG. 8, in a horizontal direction, there is a first distance F1 between the LED 430 and the area right under the pixel area 421; and in a vertical direction, there is a second distance F2 between the LED 430 and the optical fingerprint sensor 420. As the pixel area 421 is a portion of the optical fingerprint sensor 420, a distance between the LED 430 and the pixel area 421 in the vertical direction is certainly no less than the second distance F2.

From above, due to the first distance F1 and the second distance F2, the LED 430 is certainly disposed below but not right under the pixel area 421. In some embodiments, the first distance F1 and the second distance F2 may be adjusted to make the LED 430 in a suitable position, so as to improve quality of a fingerprint image formed by the optical fingerprint module.

Similarly, in the sectional view shown in FIG. 8, in the horizontal direction, there is a first distance F3 between the LED 440 and the area right under the pixel area 421; and in the vertical direction, there is a second distance F4 between the LED 440 and the optical fingerprint sensor 420. As the pixel area 421 is a portion of the optical fingerprint sensor 420, a distance between the LED 440 and the pixel area 421 in the vertical direction is certainly no less than the second distance F4. From above, due to the first distance F3 and the second distance F4, the LED 440 is certainly disposed below but not right under the pixel area 421. In some embodiments, the first distance F3 and the second distance F4 may be adjusted to make the LED 440 in a suitable position, so as to improve quality of a fingerprint image formed by the optical fingerprint module.

In some embodiments, if the backlight source includes two or more LEDs (such as including the LEDs 430 and 440), a distance between one of the two or more LEDs which is closest to the pixel area 421 and the pixel area 421 may be taken as a distance between the backlight source and the pixel area 421.

In the embodiment, light emitted from the LEDs 430 and 440 may be near-ultraviolet light, purple light, blue light, green light, yellow light, red light, near-infrared light or white light. The light emitted from the LEDs 430 and 440 may be the same or different. In some embodiments, the backlight source may include three or more LEDs which may be symmetrically arranged below the optical fingerprint sensor 420. For example, when the backlight source includes four LEDs, and a top view of the pixel area 421 is rectangular, the four LEDs may be symmetrically arranged at four sides below the pixel area 421. In some embodiments, light emitted from the LEDs may be near-ultraviolet light, purple light, blue light, green light, yellow light, red light, near-infrared light or white light. The light emitted from the LEDs may be the same, or totally different, or partially different.

By the above embodiment, in the optical fingerprint module without a light guiding plate, fingerprint image recognition may be well achieved by acquiring a clear fingerprint image, a structure of the optical fingerprint module may be simplified, and cost may be reduced. As the backlight source includes the LEDs 430 and 440, light of any one LED may be selected as the imaging light of fingerprint images in the fingerprint image acquisition, which leads to imaging effect similar to that of the embodiment shown in FIGS. 6 and 7.

As light emitted from the two LEDs has a certain open angle range but are not parallel light, incident angles of the light reaching at different areas on the upper surface of the protective layer may be slightly different. Accordingly, distances between pixels irradiated by the reflected light at different areas on the upper surface of the protective layer and corresponding reflection points may be slightly different, which results in slight image distortion. The thicker the protective layer is, the greater the distortion is. In some embodiments, light emitted from the two LEDs may be used in turn for imaging, and corresponding image calculation is performed, so as to acquire a fingerprint image with less distortion and higher accuracy, which may further improve performance of the optical fingerprint module.

In some embodiments, when the backlight source includes more than two LEDs, light emitted from the LEDs may be used in turn for imaging, and noise reduction and compensation calculation are performed, so as to acquire a fingerprint image with higher quality and accuracy, which may further improve performance of the optical fingerprint module.

Figure 9:
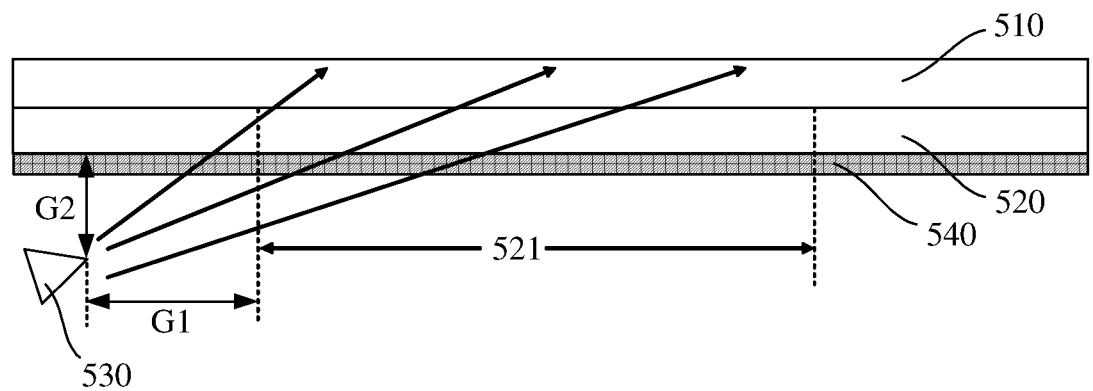
FIG. 9 schematically illustrates a sectional view of an optical fingerprint module according to an embodiment.

In an embodiment, another optical fingerprint module is provided. FIG. 9 schematically illustrates a sectional view of the optical fingerprint module. The optical fingerprint module includes a protective layer 510, an optical fingerprint sensor 520 and a backlight source 530.

Referring to FIG. 9, the backlight source 530 is disposed below a pixel area 521, so that an acute angle is formed between light emitted from the backlight source 530 and an upper surface of the protective layer 510.

The light emitted from the backlight source 530 is shown as unidirectional arrows in FIG. 9. As the backlight source 530 is disposed below the pixel area 521, the backlight source 530 is located at one side of the pixel area 521 in the sectional view in FIG. 9. Still referring to FIG. 9, an area under the pixel area 521 is an area between the two long dotted lines, while the backlight source 530 is disposed outside the area. Therefore, in the sectional view in FIG. 9, in a horizontal direction, there is a first distance G1 between the backlight source 530 and the area under the pixel area 521; and in a vertical direction, there is a second distance G2 between the backlight source 530 and the optical fingerprint sensor 520. As the pixel area 521 is a portion of the optical fingerprint sensor 520, a distance between the backlight source 530 and the pixel area 521 in the vertical direction is certainly no less than the second distance G2.

From above, due to the first distance G1 and the second distance G2, the backlight source 530 is certainly disposed below the pixel area 521. It could be understood that, the backlight source 530 being disposed below the pixel area 521 means that the backlight source 530 is disposed lower than but not right under the pixel area 521. In some embodiments, the first distance G1 and the second distance G2 may be adjusted to make the backlight source 530 in a suitable position, so as to improve quality of a fingerprint image formed by the optical fingerprint module.

More detailed structures of the optical fingerprint module can be found in the above descriptions.

Different from the embodiment shown in FIG. 7, in the embodiment as shown in FIG. 9, a light anti-reflection layer 540, which is capable of increasing a proportion of the light emitted from the backlight source 530 which enters into the optical fingerprint sensor 520, may be disposed on a surface of the optical fingerprint sensor 520 which is close to the backlight source 530.

By the above optical fingerprint module without a light guiding plate, fingerprint image recognition may be well achieved by acquiring a clear fingerprint image, a structure of the optical fingerprint module may be simplified, and cost may be reduced. Further, the surface of the optical fingerprint sensor 520 which is close to the backlight source 530 may further have the light anti-reflection layer 540 thereon, and the light anti-reflection layer 540 is capable of increasing the proportion of light emitted from the backlight source 530 which enters into the optical fingerprint sensor 520. In this way, the fingerprint image may be acquired using more light to have higher quality and accuracy, and thus performance of the optical fingerprint module may be further improved.

Figure 10:
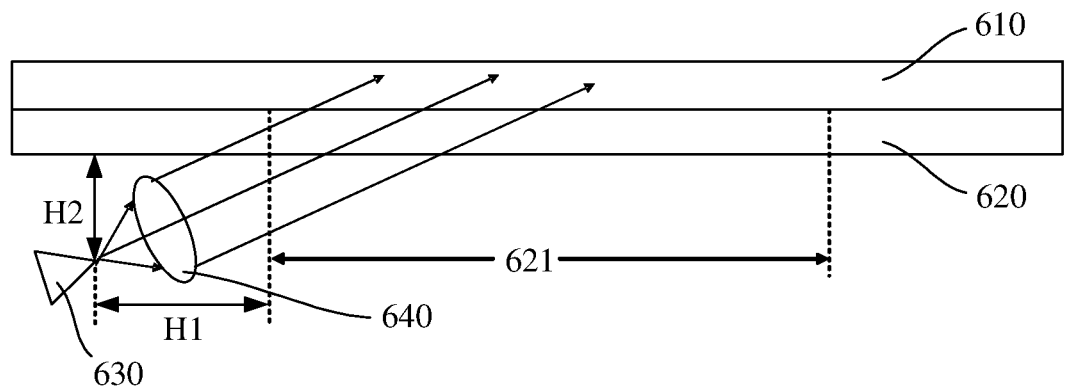
FIG. 10 schematically illustrates a sectional view of an optical fingerprint module according to an embodiment.

In an embodiment, another optical fingerprint module is provided. FIG. 10 schematically illustrates a sectional view of the optical fingerprint module. The optical fingerprint module includes a protective layer 610, an optical fingerprint sensor 620 and a backlight source 630.

Referring to FIG. 10, the backlight source 630 is disposed below a pixel area 621, so that an acute angle is formed between light emitted from the backlight source 630 and an upper surface of the protective layer 610.

The light emitted from the backlight source 630 is shown as unidirectional arrows in FIG. 10. As the backlight source 630 is disposed below the pixel area 621, the backlight source 630 is located at one side of the pixel area 621 in the sectional view in FIG. 10. Still referring to FIG. 10, an area under the pixel area 621 is an area between the two long dotted lines, while the backlight source 630 is disposed outside the area. Therefore, in the sectional view in FIG. 10, in a horizontal direction, there is a first distance H1 between the backlight source 630 and the area under the pixel area 621; and in a vertical direction, there is a second distance H2 between the backlight source 630 and the optical fingerprint sensor 620. As the pixel area 621 is a portion of the optical fingerprint sensor 620, a distance between the backlight source 630 and the pixel area 621 in the vertical direction is certainly no less than the second distance H2.

From above, due to the first distance H1 and the second distance H2, the backlight source 630 is certainly disposed below the pixel area 621. It could be understood that, the backlight source 630 being disposed below the pixel area 621 means that the backlight source 630 is disposed lower than but not right under the pixel area 621. In some embodiments, the first distance H1 and the second distance H2 may be adjusted to make the backlight source 630 in a suitable position, so as to improve quality of a fingerprint image formed by the optical fingerprint module.

More detailed structures of the optical fingerprint module can be found in the above descriptions.

Different from the embodiment shown in FIG. 7, in the embodiment as shown in FIG. 10, a light focusing lens 640 may be disposed in front of a light emitting surface of the backlight source 630, the light focusing lens 640 may be capable of focusing light emitted from the backlight source 630 into parallel light or near-parallel light, and the light emitted from the backlight source 630 enters the light focusing lens 640 and then enters the optical fingerprint sensor 620.

In some embodiments, the light focusing lens 640 may be a convex lens. If a distance between the backlight source 630 and the light focusing lens 640 is equal to focal length of the convex lens, the light passing through the light focusing lens 640 is focused to be parallel light. In some embodiments, the focusing lens 640 may be other suitable lenses, such as a Fresnel lens.

By the above optical fingerprint module without a light guiding plate, fingerprint image recognition may be well achieved by acquiring a clear fingerprint image, a structure of the optical fingerprint module may be simplified, and cost may be reduced. Further, the light focusing lens 640 which is capable of focusing the light emitted from the backlight source 630 into parallel light or near-parallel light may be disposed in front of the light emitting surface of the backlight source 630. The light emitted from the backlight source 630 enters the light focusing lens 640, and then enters the optical fingerprint sensor 620. As a result, the fingerprint image may be acquired using the parallel light or the near-parallel light to have less distortion and higher accuracy, and thus performance of the optical fingerprint module may be further improved.

Figure 11:
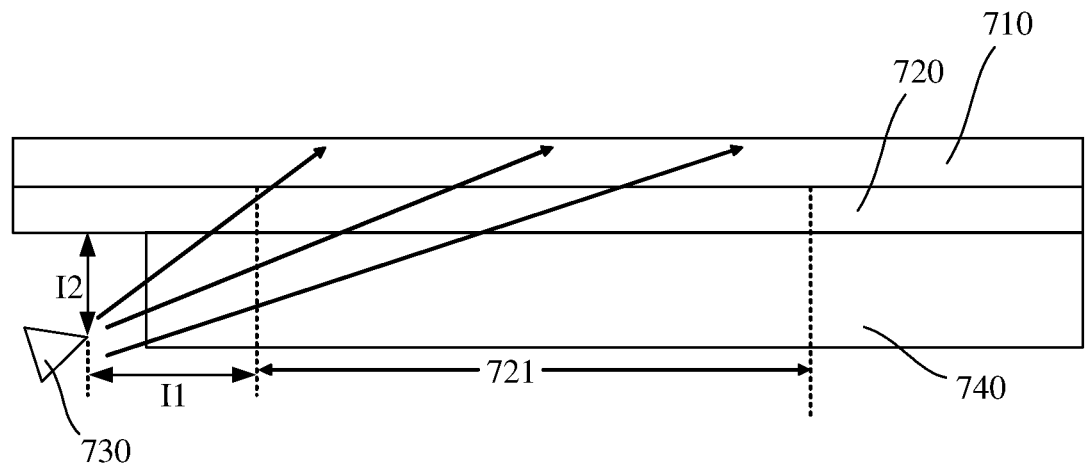
FIG. 11 schematically illustrates a sectional view of an optical fingerprint module according to an embodiment.

In an embodiment, another optical fingerprint module is provided. FIG. 11 schematically illustrates a sectional view of the optical fingerprint module. The optical fingerprint module includes a protective layer 710, an optical fingerprint sensor 720 and a backlight source 730.

Referring to FIG. 11, the backlight source 730 is disposed below a pixel area 721, so that an acute angle is formed between light emitted from the backlight source 730 and an upper surface of the protective layer 710.

The light emitted from the backlight source 730 is shown as unidirectional arrows in FIG. 11. As the backlight source 730 is disposed below the pixel area 721, the backlight source 730 is located at one side of the pixel area 721 in the sectional view in FIG. 11. Still referring to FIG. 11, an area under the pixel area 721 is an area between the two long dotted lines, while the backlight source 730 is disposed outside the area. Therefore, in the sectional view in FIG. 11, in a horizontal direction, there is a first distance 11 between the backlight source 730 and the area under the pixel area 721; and in a vertical direction, there is a second distance 12 between the backlight source 730 and the optical fingerprint sensor 720. As the pixel area 721 is a portion of the optical fingerprint sensor 720, a distance between the backlight source 730 and the pixel area 721 in the vertical direction is certainly no less than the second distance 12.

From above, due to the first distance 11 and the second distance 12, the backlight source 730 is certainly disposed below the pixel area 721. It could be understood that, the backlight source 730 being disposed below the pixel area 721 means that the backlight source 730 is disposed lower than but not right under the pixel area 721. In some embodiments, the first distance 11 and the second distance 12 may be adjusted to make the backlight source 730 in a suitable position, so as to improve quality of a fingerprint image formed by the optical fingerprint module.

More detailed structures of the optical fingerprint module can be found in the above descriptions.

Different from the embodiment shown in FIG. 7, in the embodiment as shown in FIG. 11, a non-opaque dielectric layer 740 may be disposed between the optical fingerprint sensor 720 and the backlight source 730, and the light emitted from the backlight source 730 enters the non-opaque dielectric layer 740 and then enters the optical fingerprint sensor 720. In the embodiment, the non-opaque dielectric layer 740 always has a refractive index greater than that of air, and light is enabled to enter the non-opaque dielectric layer 740 from a side surface of the non-opaque dielectric layer 730 which is a vertical surface or a near-vertical surface, so that the light emitted from the backlight source 730 reaches the upper surface of the protective layer 710 with a greater incident angle (that is, the light can reach the upper surface of the protective layer 710 in a direction closer to be parallel to the upper surface of the protective layer 710). When the incident angle of the light is larger than a certain angle, total reflection occurs (i.e., when the incident angle is greater than a critical angle, the light is totally reflected at a contact interface between the protective layer 710 and air) to greatly improve quality of the image.

In some embodiments, the non-opaque dielectric layer 740 may have a refraction index above 1.2, which may further improve performance of the optical fingerprint module.

In some embodiments, the non-opaque dielectric layer 740 may include glass, plastic or optical adhesive.

In some embodiments, a second optical adhesive layer may be disposed between the optical fingerprint sensor 720 and the non-opaque dielectric layer 740, wherein the light emitted from the backlight source 730 enters the second optical adhesive layer from the non-opaque dielectric layer 740, and then enters the optical fingerprint sensor 720 from the second optical adhesive layer. The second optical adhesive layer may avoid air between the optical fingerprint sensor 720 and the non-opaque dielectric layer 740, so as to further prevent the light from being scattered and refracted at the interface between the air and the optical fingerprint sensor 720 or the non-opaque dielectric layer 740, which may improve quality of fingerprint images to be formed.

In some embodiments, a light emitting surface of the backlight source 730 may be directly covered by the non-opaque dielectric layer 740, so that the light emitted from the backlight source 730 directly enters the non-opaque dielectric layer 740, and there is no air in the light path from the backlight source 730 to the protective layer 710, which may further improve quality of fingerprint images to be formed.

Figure 12:
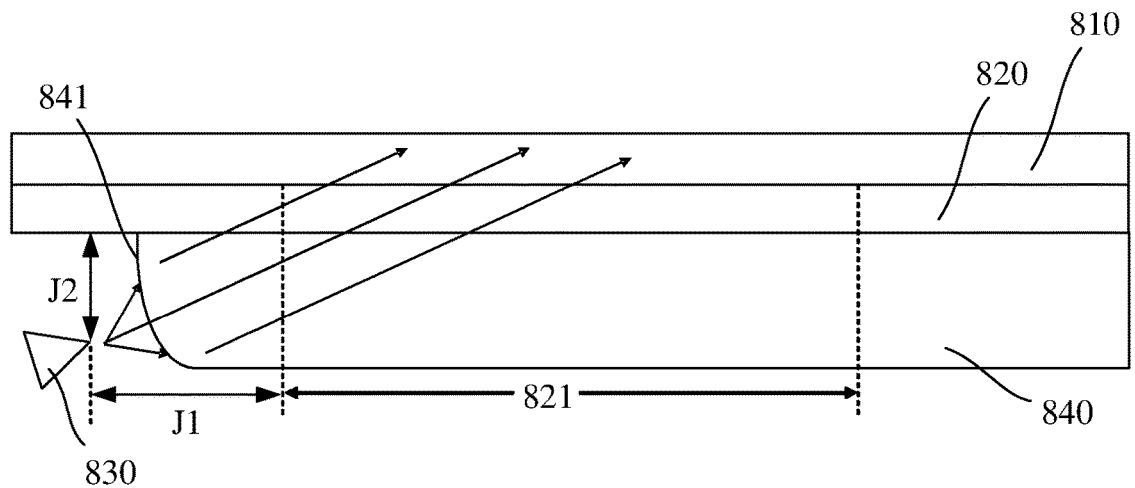
FIG. 12 schematically illustrates a sectional view of an optical fingerprint module according to an embodiment.

In an embodiment, another optical fingerprint module is provided. FIG. 12 schematically illustrates a sectional view of the optical fingerprint module. The optical fingerprint module includes a protective layer 810, an optical fingerprint sensor 820 and a backlight source 830.

Referring to FIG. 12, the backlight source 830 is disposed below a pixel area 821, so that an acute angle is formed between light emitted from the backlight source 830 and an upper surface of the protective layer 810.

The light emitted from the backlight source 830 is shown as unidirectional arrows in FIG. 12. As the backlight source 830 is disposed below the pixel area 821, the backlight source 830 is located at one side of the pixel area 821 in the sectional view in FIG. 12. Still referring to FIG. 12, an area under the pixel area 821 is an area between the two long dotted lines, while the backlight source 830 is disposed outside the area. Therefore, in the sectional view in FIG. 12, in a horizontal direction, there is a first distance J1 between the backlight source 830 and the area under the pixel area 821; and in a vertical direction, there is a second distance J2 between the backlight source 830 and the optical fingerprint sensor 820. As the pixel area 821 is a portion of the optical fingerprint sensor 820, a distance between the backlight source 830 and the pixel area 821 in the vertical direction is certainly no less than the second distance J2.

From above, due to the first distance J1 and the second distance J2, the backlight source 830 is certainly disposed below the pixel area 821. It could be understood that, the backlight source 830 being disposed below the pixel area 821 means that the backlight source 830 is disposed lower than but not right under the pixel area 821. In some embodiments, the first distance J1 and the second distance J2 may be adjusted to make the backlight source 830 in a suitable position, so as to improve quality of a fingerprint image formed by the optical fingerprint module.

Referring to FIG. 12, a non-opaque dielectric layer 840 may be disposed between the optical fingerprint sensor 820 and the backlight source 830, and the light emitted from the backlight source 830 enters the non-opaque dielectric layer 840 and then enters the optical fingerprint sensor 820. In some embodiments, the non-opaque dielectric layer 840 may have a refraction index above 1.2, which may further improve performance of the optical fingerprint module. In some embodiments, the non-opaque dielectric layer 840 may include glass, plastic or optical adhesive.

More detailed structures of the optical fingerprint module can be found in the above descriptions.

Different from the embodiment shown in FIG. 11, in the embodiment as shown in FIG. 12, a side surface of the non-opaque dielectric layer 840 may be a light focusing surface 841, and the light emitted from the backlight source 830 enters the non-opaque dielectric layer 840 from the light focusing surface 841 which focuses light emitted from the backlight source 830 into parallel light or near-parallel light.

In the embodiment, the light focusing surface 841 of the non-opaque dielectric layer 840 is an ellipsoidal crown surface. In other embodiments, the light focusing surface 841 of the non-opaque dielectric layer 840 may be an oblique surface, a spherical crown surface, a conical side surface or a pyramid side surface.

In some embodiments, a lower surface of the non-opaque dielectric layer may be a light focusing surface.

By the above optical fingerprint module without a light guiding plate, fingerprint image recognition may be well achieved by acquiring a clear fingerprint image, a structure of the optical fingerprint module may be simplified, and cost may be reduced. More effect and advantages of the embodiment may be referred to the descriptions of the above embodiment. Further, the side surface of the non-opaque dielectric layer 840 serves as the light focusing surface 841 which is capable of focusing light emitted from the backlight source 830 into parallel light or near-parallel light. The light emitted from the backlight source 830 enters the non-opaque dielectric layer 840, and then enters the optical fingerprint sensor 820. As a result, the fingerprint image may be acquired using the parallel light or the near-parallel light to have less distortion and higher accuracy, and thus performance of the optical fingerprint module may be further improved.

Figure 13:
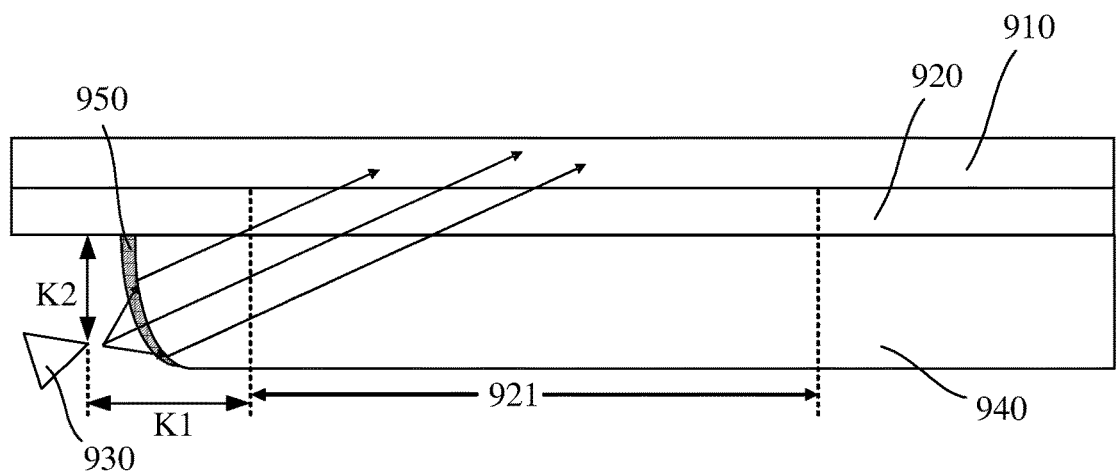
FIG. 13 schematically illustrates a sectional view of an optical fingerprint module according to an embodiment.

In an embodiment, another optical fingerprint module is provided. FIG. 13 schematically illustrates a sectional view of the optical fingerprint module. The optical fingerprint module includes a protective layer 910, an optical fingerprint sensor 920 and a backlight source 930.

Referring to FIG. 13, the backlight source 930 is disposed below a pixel area 921, so that an acute angle is formed between light emitted from the backlight source 930 and an upper surface of the protective layer 910.

The light emitted from the backlight source 930 is shown as unidirectional arrows in FIG. 13. As the backlight source 930 is disposed below the pixel area 921, the backlight source 930 is located at one side of the pixel area 921 in the sectional view in FIG. 13. Still referring to FIG. 13, an area under the pixel area 921 is an area between the two long dotted lines, while the backlight source 930 is disposed outside the area. Therefore, in the sectional view in FIG. 13, in a horizontal direction, there is a first distance K1 between the backlight source 930 and the area under the pixel area 921; and in a vertical direction, there is a second distance K2 between the backlight source 930 and the optical fingerprint sensor 920. As the pixel area 921 is a portion of the optical fingerprint sensor 920, a distance between the backlight source 930 and the pixel area 921 in the vertical direction is certainly no less than the second distance K2.

From above, due to the first distance K1 and the second distance K2, the backlight source 930 is certainly disposed below the pixel area 921. It could be understood that, the backlight source 930 being disposed below the pixel area 921 means that the backlight source 930 is disposed lower than but not right under the pixel area 921. In some embodiments, the first distance K1 and the second distance K2 may be adjusted to make the backlight source 930 in a suitable position, so as to improve quality of a fingerprint image formed by the optical fingerprint module.

Referring to FIG. 13, a non-opaque dielectric layer 940 may be disposed between the optical fingerprint sensor 920 and the backlight source 930, and the light emitted from the backlight source 930 enters the non-opaque dielectric layer 940 and then enters the optical fingerprint sensor 920. In some embodiments, the non-opaque dielectric layer 940 may have a refraction index above 1.2, which may further improve performance of the optical fingerprint module. In some embodiments, the non-opaque dielectric layer 940 may include glass, plastic or optical adhesive. In some embodiments, a side surface of the non-opaque dielectric layer 940 may be a light focusing surface 941, and the light emitted from the backlight source 930 enters the non-opaque dielectric layer 940 from the light focusing surface 941 which focuses the light emitted from the backlight source 930 into parallel light or near-parallel light.

More detailed structures of the optical fingerprint module can be found in the above descriptions.

Different from the embodiment shown in FIG. 12, in the embodiment as shown in FIG. 13, a light anti-reflection layer 950, which is capable of increasing a proportion of the light emitted from the backlight source 930 which enters into the non-opaque dielectric layer 940, may be disposed on the light focusing surface 941 of the non-opaque dielectric layer 940.

In the above optical fingerprint module without a light guiding plate, the side surface of the non-opaque dielectric layer 940 serves as the light focusing surface 941 which is capable of focusing light emitted from the backlight source 930 into parallel light or near-parallel light. The light emitted from the backlight source 930 enters the non-opaque dielectric layer 940, and then enters the optical fingerprint sensor 920. As a result, the fingerprint image may be acquired using the parallel light or the near-parallel light to have less distortion and higher accuracy, and thus performance of the optical fingerprint module may be further improved.

Further, the light focusing surface 941 of the non-opaque dielectric layer 940 may further have a light anti-reflection layer 950 formed thereon, and the light anti-reflection layer 950 is capable of increasing the proportion of the light emitted from the backlight source 930 which enters the non-opaque dielectric layer 940. Therefore, the fingerprint image may be acquired using more light to have higher quality and accuracy, and thus performance of the optical fingerprint module may be further improved.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. An optical fingerprint module, comprising:
   an optical fingerprint sensor comprising a non-opaque substrate and a device layer located on a surface of the non-opaque substrate, wherein the device layer comprises a pixel area consisting of a plurality of pixels, each of the plurality of pixels comprises a non-opaque region and a light blocking region, the light blocking region comprises a photosensitive element, and the non-opaque region enables light to penetrate through the pixel area of the device layer;
   a protective layer disposed above the optical fingerprint sensor; and
   a backlight source disposed below the pixel area, wherein an acute angle is formed between light emitted from the backlight source and an upper surface of the protective layer,
   wherein a non-opaque dielectric layer is disposed between the optical fingerprint sensor and the backlight source, and the light emitted from the backlight source enters the non-opaque dielectric layer and then enters the optical fingerprint sensor,
   wherein a side surface or a lower surface of the non-opaque dielectric layer is a light focusing surface, and the light emitted from the backlight source enters the non-opaque dielectric layer from the light focusing surface which focuses the light emitted from the backlight source into parallel light or near-parallel light.

2. The optical fingerprint module according to claim 1, wherein a first optical adhesive layer is disposed between the optical fingerprint sensor and the protective layer, wherein the light emitted from the backlight source penetrates through the non-opaque substrate, then penetrates through the device layer via the non-opaque region, enters the first optical adhesive layer, and finally enters the protective layer from the first optical adhesive layer.

3. The optical fingerprint module according to claim 1, wherein a first optical adhesive layer is disposed between the optical fingerprint sensor and the protective layer, wherein the light emitted from the backlight source penetrates through the device layer via the non-opaque region, then penetrates through the non-opaque substrate, enters the first optical adhesive layer, and finally enters the protective layer from the first optical adhesive layer.

4. The optical fingerprint module according to claim 1, wherein the backlight source comprises at least one Light Emitting Diode (LED), and light of the LED is at least one of near-ultraviolet light, purple light, blue light, green light, yellow light, red light, near-infrared light or white light.

5. The optical fingerprint module according to claim 1, wherein the backlight source comprises at least two LEDs which are symmetrically arranged below the optical fingerprint sensor, and light of the LEDs is at least one of near-ultraviolet light, purple light, blue light, green light, yellow light, red light, near-infrared light or white light.

6. The optical fingerprint module according to claim 1, wherein a light focusing lens is disposed in front of a light emitting surface of the LED, the light focusing lens is capable of focusing light of the LED into parallel light or near-parallel light, and the light emitted from the backlight source enters the light focusing lens and then enters the optical fingerprint sensor.

7. The optical fingerprint module according to claim 1, wherein a light anti-reflection layer, which is capable of increasing a proportion of the light emitted from the backlight source which enters into the optical fingerprint sensor, is disposed on a surface of the optical fingerprint sensor which is close to the backlight source.

8. The optical fingerprint module according to claim 1, wherein a second optical adhesive layer is disposed between the optical fingerprint sensor and the non-opaque dielectric layer, wherein the light emitted from the backlight source enters the second optical adhesive layer from the non-opaque dielectric layer, and then enters the optical fingerprint sensor from the second optical adhesive layer.

9. The optical fingerprint module according to claim 8, wherein a light anti-reflection layer, which is capable of increasing a proportion of the light emitted from the backlight source which enters into the non-opaque dielectric layer, is disposed on the side surface or the lower surface of the non-opaque dielectric layer.

10. The optical fingerprint module according to claim 1, wherein the non-opaque dielectric layer comprises at least one of glass, plastic or optical adhesive.

11. The optical fingerprint module according to claim 10, wherein the non-opaque dielectric layer has a refraction index above 1.2.

12. The optical fingerprint module according to claim 1, wherein the light focusing surface of the non-opaque dielectric layer is one of an oblique surface, a spherical crown surface, an ellipsoidal crown surface, a conical side surface or a pyramid side surface.

13. The optical fingerprint module according to claim 1, wherein the protective layer comprises a single layer or multiple layers, wherein a light filtering layer is disposed on at least one of the upper surface of the protective layer, a lower surface of the protective layer and an upper surface of the optical fingerprint sensor.

14. The optical fingerprint module according to claim 1, wherein the device layer further comprises a plurality of scanning lines arranged in a first axial direction and a plurality of data lines arranged in a second axial direction, wherein the plurality of scanning lines and the plurality of data lines define a plurality of grids, and the pixels are located in the grids.

15. The optical fingerprint module according to claim 2, wherein the first optical adhesive layer is at least one of a heat curing optical adhesive layer, a photo curing optical adhesive layer or an optical double-sided adhesive tape.

16. The optical fingerprint module according to claim 8, wherein the second optical adhesive layer is at least one of a heat curing optical adhesive layer, a photo curing optical adhesive layer or an optical double-sided adhesive tape.

17. The optical fingerprint sensor module according to claim 5, wherein a light focusing lens is disposed in front of a light emitting surface of the LED, the light focusing lens is capable of focusing light of the LED into parallel light or near-parallel light, and the light emitted from the backlight source enters the light focusing lens and then enters the optical fingerprint sensor.

18. The optical fingerprint sensor module according to claim 3, wherein the first optical adhesive layer is at least one of a heat curing optical adhesive layer, a photosensitive optical adhesive layer or an optical double-sided adhesive tape.

* * * * *